W. J. BOWMAN.
FUEL SUPPLY VALVE FOR CARBURETERS.
APPLICATION FILED MAY 26, 1917.
1,299,904. Patented Apr. 8, 1919.
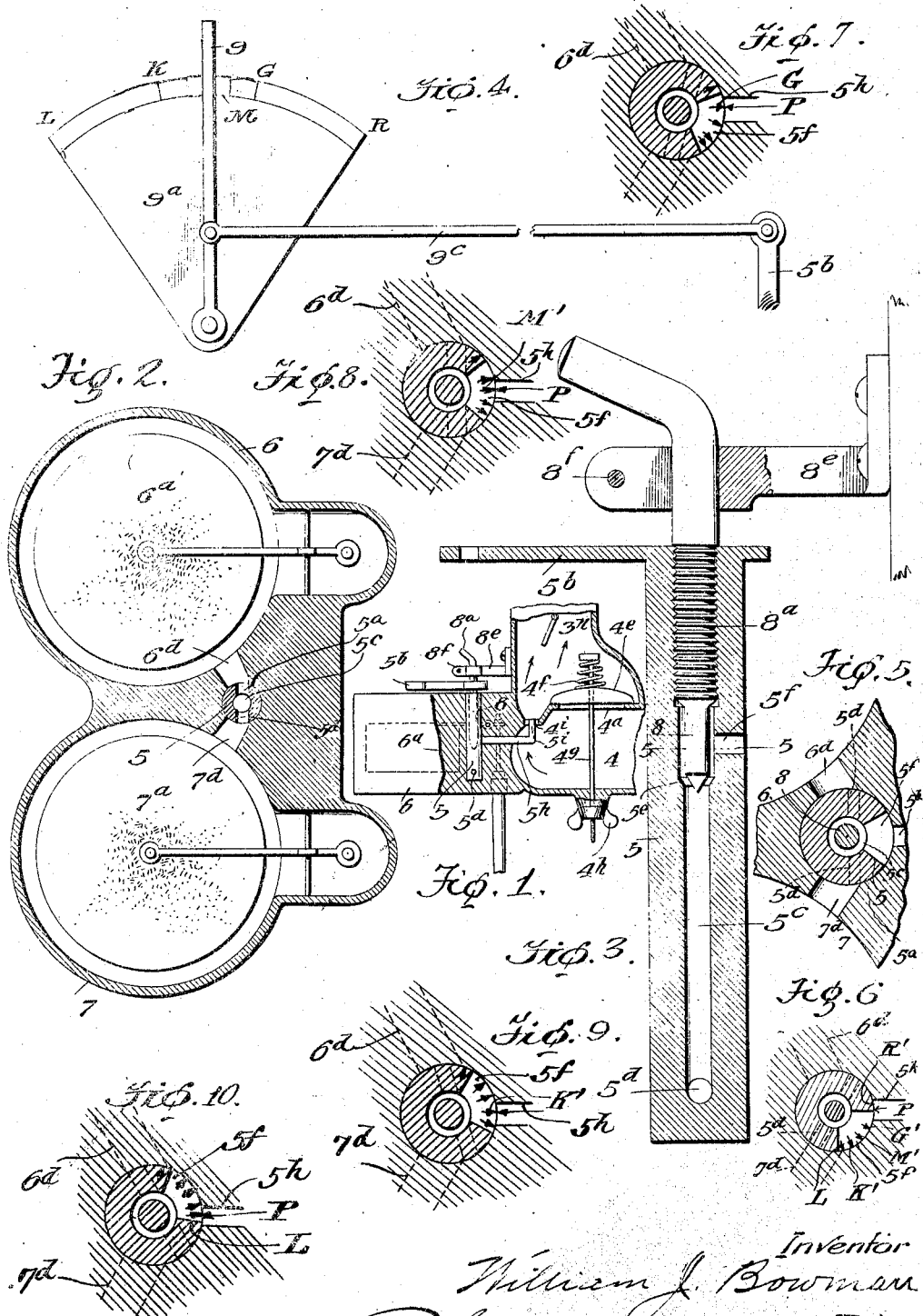

UNITED STATES PATENT OFFICE.

WILLIAM J. BOWMAN, OF CHICO, CALIFORNIA.

FUEL-SUPPLY VALVE FOR CARBURETERS.

1,299,904. Specification of Letters Patent. Patented Apr. 8, 1919.

Application filed May 26, 1917. Serial No. 171,192.

*To all whom it may concern:*

Be it known that I, WILLIAM J. BOWMAN, a citizen of the United States, residing at Chico, in the county of Butte and State of California, have invented certain new and useful Improvements in Fuel-Supply Valves for Carbureters; and I hereby declare that the following is a full, clear, and exact description thereof, reference being had to the accompanying drawings, which form part of this specification.

This invention is a novel improvement in valves for carbureters particularly designed for utilizing heavy hydro-carbons, such as kerosene, for fuel.

A further object of the invention is to provide novel valve means whereby the fuel delivered to the carbureter is controlled in such manner that the carbureter can be started and stopped on gasolene, and as a heavier or richer fuel is desired kerosene will be admitted together with the gasolene, and the quantity of kerosene may be gradually increased as the gasolene is diminished until if desired all the gasolene may be cut off and and only kerosene employed, but in closing the valve the gasolene will be again supplied.

An important feature of the invention is a novel arrangement of a two-fuel-main valve and an auxiliary adjusting valve so arranged as to be controlled by one movement of the main valve, and readily operated from the driver's seat by the usual fuel regulating devices; and so arranged as to give an initial supply of gasolene and by merely shifting the main valve, the supply of fuel may be changed from gasolene to kerosene, or a mixture thereof may be supplied; and such valve is capable of supplying any grade of fuel at the will of the operator and as the valve is opened the fuel is enriched and as it is closed the heavier fuel supply is lessened until just before closing only gasolene is supplied. The auxiliary valve is also so arranged that it can be adjusted primarily while the main valve is at rest, and thereafter the shifting of the main valve will automatically vary the position of the auxiliary valve relative thereto, so as to control the fuel supply in a most effective manner.

I will explain the invention with reference to the embodiment thereof illustrated in the accompanying drawings which will enable others to comprehend and use the same; and summarize in the claims the essential features of construction and novel combinations of parts for which protection is desired.

In said drawings:

Figure 1 is a sectional elevation of the complete apparatus.

Fig. 2 is an enlarged detail section through the float valve chamber and main valve.

Fig. 3 is an enlarged sectional view of the main valve and controlling needle valve.

Fig. 4 is a detail view of one means for operating the main controlling valve.

Fig. 5 is an enlarged detail section through the main controlling valve and its parts on line 5—5 Fig. 3.

Figs. 6, 7, 8, 9, and 10 are detail diagrams illustrating the various positions of the main valve.

The carbureter casing, air heating chamber and fuel and air passages therein; and the manifold, and connections thereof, may be of any suitable construction and are not therefore claimed herein, the present application having particularly reference to the fuel supply and valves for regulating same.

In the example shown in the drawings two float chambers 6 and 7 are attached to or formed on the wall of the chamber 4 adjacent the opening 4¹. Each of these chambers is provided with the usual float (indicated at 6ª, 7ª respectively) and connections to regulate the supply of liquid fuel to such chamber in the usual manner, and which do not require any detailed illustration herein; for example, a supply of gasolene may be maintained in the chamber 6, and a supply of kerosene be maintained in the chamber 7.

Between the chambers 6 and 7 is a valve chamber 5ª in which is fitted a rotary valve 5, that extends out of and above the upper end of chamber 5ª and is provided with a suitable handle 5ᵇ 5ʸ which it can be turned.

Said valve 5 is provided with an internal bore 5ᶜ and with a transverse port 5ᵈ the opposite ends of which port are respectively adapted to communicate with ports 6ᵈ and 7ᵈ connecting the chamber 5ª respectively with the chambers 6 and 7, see Figs. 2 and 5. The said ports are so relatively arranged that by moving the valve 5 in one direction gasolene will first be supplied; in the central intermediate position of the valve both gasolene and kerosene would be supplied; and by sufficiently moving the valve in the same direction only kerosene will be supplied. On the return movement gasolene and kerosene will be supplied at the intermediate position, and just before closing only gasolene will be supplied. Thus by operating one valve the operator is enabled to supply either gasolene or kerosene or mixtures thereof to the carbureter. The valve 5 is provided with a lateral port 5$^f$ above the seat 5$^e$ of valve 8, and said port 5$^f$ connects with a pipe 5$^h$ leading to the spray nozzle 5$^i$ as shown.

The ports 5$^d$, 6$^d$ and 7$^d$ are relatively so arranged that about one-third of the complete movement of the valve 5 will change the fuel from kerosene to gasolene or vice versa; and during about two-thirds of the permissible movement of the valve 5 gasolene from G to R Fig. 5 and kerosene from K to L Fig. 5 will be supplied.

The proper amount of fuel supplied through the valve 5 is regulable by an auxiliary or secondary valve 8 within the valve 5. As shown this valve is a needle valve and adapted to engage a seat 5$^e$ in bore 5$^c$, and it may be formed on the inner end of a stem 8$^a$ having a threaded engagement with the upper end of the bore 5$^c$.

The stem 8$^a$ of valve 8 extends above and outside of the valve 5 and through a bracket or clamp 8$^e$ which may be attached to the wall of the chamber 4, or other suitable adjacent fixed support. The bracket 8$^e$ is preferably slit and may be clamped upon the stem of the valve 8$^a$ by means of a screw 8$^f$; and after the valve 8 is properly adjusted in valve 5 it can be rigidly fastened in adjusted position leaving the valve 5 free to be rotatably shifted or turned.

By adjusting the needle valve relative to seat 5$^e$ and then locking the needle valve against rotation, it follows that the extent of opening of the needle valve will be varied by turning the main valve either backward or forward, as the needle valve is held stationary with the body of the carbureter and cannot rotate with the main valve; therefore the shifting of the main valve to different positions automatically varies the needle valve opening. I find that kerosene requires a smaller opening of the valve than gasolene, and the desired variation of the needle valve is automatically accomplished by shifting the main valve.

The valve lever 5$^b$ should be connected by suitable means with an operating lever adjacent the driver's seat. As diagrammatically illustrated in Fig. 4 lever 5$^b$ is connected by a rod 9$^c$ to a lever 9 pivoted on a suitable support and provided with an index plate 9$^a$ which indicates the nature of the mixture that would be supplied to the atomizer or carbureter. When lever 9 (and valve 5) are in a central position, (indicated in Figs. 4–5) both kerosene and gasolene will be supplied, when lever 9 is turned to the left kerosene only will be supplied, and when turned to the right gasolene only will be supplied.

Thus a large range of variation of the fuel supply is provided by adjusting the valve 5$^o$ by lever 9.

Various operative positions of the main valve are illustrated diagrammatically in Figs. 6 to 10 inclusive. In starting the machine lever 9 should be shifted to the point R so that the imaginary point indicated at R' on the valve, Fig. 6, registers with the imaginary point indicated at P in port 5$^h$. The kerosene port 6$^d$ is then closed but port 5$^d$ registers fully with the gasolene port 7$^d$. This gives a very rich mixture of gasolene and air and in this position the needle valve should be open about ⅔ of a revolution. By shifting lever 9 to the point G the valve 5 is turned so that the imaginary point G' registers with the imaginary point P as indicated in Fig. 7, then the kerosene port 6$^d$ remains closed but the gasolene port remains open but such shifting of the valve 5 causes the needle valve to close about ⅓ of a turn, and thus restricts the flow of the fuel past the needle valve 8. This produces a normal mixture of gasolene and air, which might be used to run the engine on gasolene.

By shifting lever 9 to the center position M the valve 5 is shifted so that the imaginary point M' registers with the imaginary point P, as indicated in Fig. 8. In this position both kerosene and gasolene ports are opened and a mixture of half gasolene and half kerosene is supplied to the port 5$^f$ and the needle valve slightly farther closed. Such a mixture is seldom necessary but can be used to warm up the engine in cold weather.

By shifting lever 9 to point K the valve 5 is shifted to bring the imaginary point K' into register with the imaginary point P, as indicated in Fig. 9, in which position the kerosene port is fully opened but the gasolene port closed, and the needle valve farther closed, being open about a quarter turn; the result is a mixture of kerosene and air, which is sufficiently rich to use for slow running.

By shifting lever 9 to the point L the valve 5 is shifted so as to bring the imaginary point L' into register with the imaginary point P, as indicated in Fig. 10, in which position the kerosene port remains fully open and the gasolene port closed; but the needle valve 5 is farther closed, being then opened about ⅛ of a turn. This makes a very lean explosive mixture of kerosene and air which is highly economical for fast running. With this construction the carbureter is under the absolute control of the driver, both for quality and quantity of fuel and changing from one fuel to another.

The inrush of air through the opening 4¹ past the nozzle 5¹ creates a suction which will draw in the fuel and atomize it and the atomized fuel and air pass through the opening 3ᵈ into the heating chamber wherein they are heated by the heat derived from the exhaust gases which furnish sufficient heat to convert the oil or fuel into a gaseous mixture before the same is delivered into the inlet ports of the engine.

*Operation.*

The air is sucked in at the inlet 5¹, and the rush of air past the nozzle 5¹ creates a suction which draws the proper supply of fuel from the float chamber.

By having the auxiliary needle-valve 8 arranged within the main controlling valve 5 I obtain the desired adjustment of the needle valve simultaneously with and in suitable proportion to the adjustment of the main valve; both valves being operated by one movement of the main valve 5 which is controlled by the driver. By simply shifting valve 5 I can obtain either gasolene or kerosene, or a lean or rich mixture of the two in any desired proportion.

The control of the fuel supply by a single main valve which varies the needle-valve adjustment is important and the control of both fuel supplies and needle-valve by one main valve is also important. The change from one fuel to another can be made instantly, or the relative amount of high and low grade fuel in the mixture can be varied at will by the driver. Further the engine is not only started on gasolene but is returned to gasolene when it is desired to stop it, thus realizing every advantage of a gasolene operated carbureter, and in addition enabling kerosene to be turned on when desired and without the operator having to set or manipulate any two valves in so doing; all the control is accomplished by simply moving the lever 9 or single valve 5.

The needle-valve 8 is first adjusted to suit the desired normal running of the engine and then locked so that it cannot rotate with the main valve 5; and as the latter valve contains the seat for the needle-valve it is obvious that as the main valve is shifted the control of the needle-valve adjustment relative to its seat is correspondingly altered; and the main valve not only regulates the supply but also changes the fuel from kerosene to gasolene, and vice versa, and if adjusted at center furnishes both fuels in equal quantities.

What I claim is:

1. In combination two fluid supplies, a main valve provided with ports for establishing communication with either and both of the fluid supplies at the will of the operator, and an outlet port leading from the main valve; a secondary valve adapted to regulate said port and adjustable independently of the main valve, and means for locking the secondary valve when adjusted relatively to the main valve, the movement of the main valve varying the relative adjustment of the said secondary valve, substantially as described.

2. In a carbureter, a fuel supply, a main valve controlling the fuel supply; and a secondary valve within the main valve for regulating the supply, the extent of opening movement of the main valve varying the relative adjustment of the secondary valve.

3. In a carbureter a chamber, an inlet to said chamber, a fuel supply connected with said inlet, a main valve for controlling the fuel supply; and a secondary valve within the main valve for regulating the supply, the extent of opening movement of the main valve varying the relative adjustment of the secondary valve.

4. In combination, a valve chamber communicating with two supplies, a main valve in said chamber controlling both supplies, and a secondary valve controlling the flow of fuel through the main valve, said secondary valve being adjustable independently of the main valve; the operation of the main valve varying the relative adjustment of the secondary valve.

5. In combination, two float chambers, a valve chamber communicating with both float chambers, a main valve in said valve chamber controlling both communications, and a secondary valve within the main valve for controlling the flow of fuel through the main valve, said secondary valve being adjustable independently of the main valve for regulating purposes; the operation of the main valve varying the relative adjustment of the secondary valve.

6. In combination, two float chambers, a valve chamber communicating with both float chambers, a main valve in said valve chamber having ports adapted to establish communication with either or both of said float chambers, and an outlet from said valve chamber; with a secondary valve controlling the passage of fuel through the main valve; the movement of the main valve varying the relative adjustment of the said secondary valve.

7. In combination, two float chambers, a valve chamber communicating with both float chambers, a main valve in said valve chamber having ports adapted to establish communication with either or both of said fuel chambers, an outlet port from said valve chamber; and a secondary valve within the main valve controlling the passage of fuel therethrough, the movement of the main valve varying the relative adjustment of said secondary valve.

8. In combination two fluid supplies, a main valve provided with ports for establishing communication with either or both of the supplies at the will of the operator, an outlet port leading from the main valve, and a secondary valve controlling the outlet from the main valve and means for adjusting the secondary valve; the movement of the main valve varying the relative adjustment of the said secondary valve, substantially as described.

In testimony that I claim the foregoing as my own, I affix my signature.

WILLIAM J. BOWMAN.